(12) United States Patent
Vesa

(10) Patent No.: US 7,611,126 B2
(45) Date of Patent: Nov. 3, 2009

(54) LIFT DEVICE AND PNEUMATIC ACTUATOR THEREFOR

(76) Inventor: Aarno Vesa, 177 Skyline Avenue, Winnipeg, Manitoba (CA) P7B 6K6

(*) Notice: Subject to any disclaimer, the term of this patent is extended or adjusted under 35 U.S.C. 154(b) by 53 days.

(21) Appl. No.: 11/387,725

(22) Filed: Mar. 24, 2006

(65) Prior Publication Data

US 2006/0231343 A1 Oct. 19, 2006

Related U.S. Application Data

(60) Provisional application No. 60/664,951, filed on Mar. 25, 2005.

(51) Int. Cl.
*B66F 3/24* (2006.01)

(52) U.S. Cl. .................. 254/93 H; 254/2 B; 254/2 R; 414/427

(58) Field of Classification Search ......... 414/426–429; 187/273; 92/44; 254/934, 2 B, 2 R
See application file for complete search history.

(56) References Cited

U.S. PATENT DOCUMENTS

| | | | | |
|---|---|---|---|---|
| 1,344,037 | A * | 6/1920 | Heymann | 254/423 |
| 4,460,306 | A * | 7/1984 | Hawkins | 414/427 |
| 4,645,181 | A * | 2/1987 | Schapansky | 254/2 B |
| 5,112,070 | A | 5/1992 | Hahn | |
| 5,119,907 | A * | 6/1992 | Billington et al. | 182/148 |
| 5,184,930 | A * | 2/1993 | Kuhn | 414/427 |
| 5,562,389 | A | 10/1996 | Mitchell | |
| 6,082,708 | A * | 7/2000 | Mullican et al. | 254/93 HP |
| 6,095,745 | A | 8/2000 | Garnett | |
| 6,106,214 | A | 8/2000 | Saffelle et al. | |
| 6,286,813 | B1 * | 9/2001 | Coccaro | 254/93 HP |
| 6,382,644 | B1 | 5/2002 | Rawlings | |
| 6,537,017 | B2 * | 3/2003 | Stone | 414/672 |
| D473,692 | S | 4/2003 | Tafoya | |
| 6,772,990 | B2 * | 8/2004 | Sasaki et al. | 251/129.03 |
| 6,799,952 | B2 * | 10/2004 | Urbank et al. | 417/222.2 |
| 2006/0182563 | A1 * | 8/2006 | De Jong et al. | 414/427 |
| 2006/0182564 | A1 * | 8/2006 | Thiel et al. | 414/427 |

* cited by examiner

*Primary Examiner*—Saúl J Rodíguez
*Assistant Examiner*—Joshua I Rudawitz
(74) *Attorney, Agent, or Firm*—Ade & Company Inc; Ryan W. Dupuis; Kyle R. Satlerthwaite

(57) ABSTRACT

A wheel lift device includes an upright extending upwardly from a wheeled base. A carriage slides along the upright and includes a wheel support to support an automotive wheel thereon. A pneumatic lift mechanism is housed in the upright and is coupled to the carriage. A lift control comprises a supply valve to couple the lift mechanism to a source of compressed gas for lifting and a vent valve to couple the lift mechanism to a vent for lowering. The lift device has rapid response, is of low cost and requires minimal maintenance when arranged to connect to conventional compressed air supply lines of the type readily available in automotive servicing stations. Location of the lift controls directly on the upright ensures quick access for controlling the lifting and lowering of wheels in direct proximity to the task being performed.

20 Claims, 9 Drawing Sheets

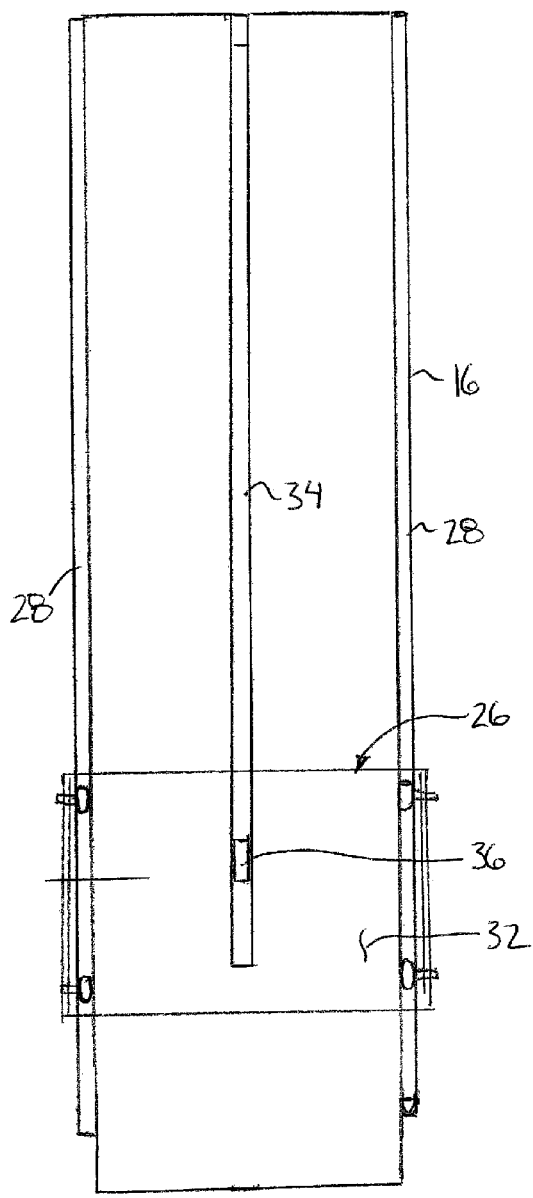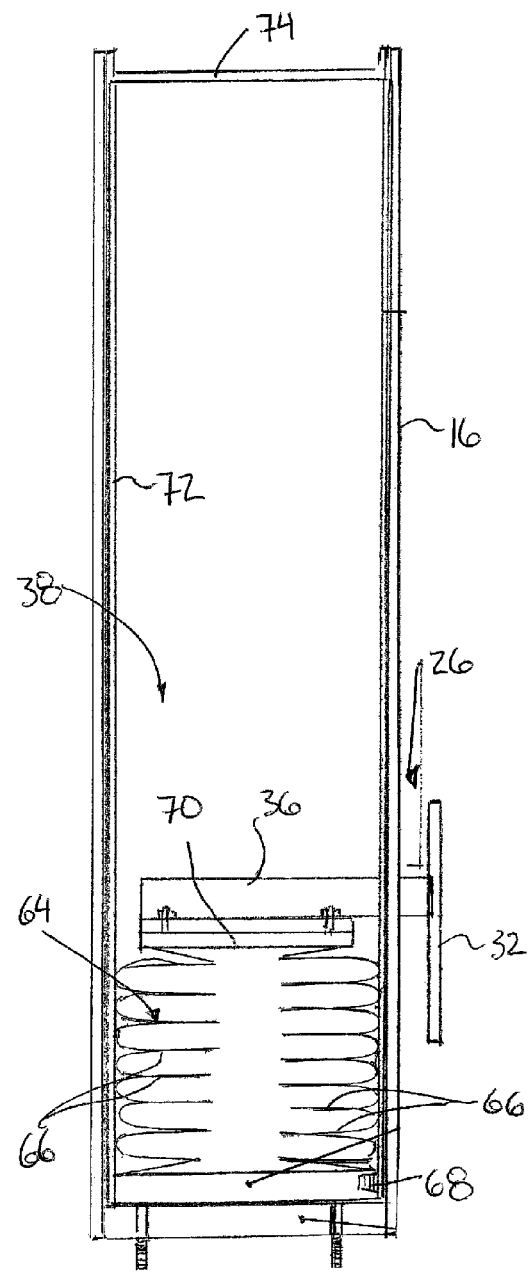
FIGURE 9
FIGURE 10

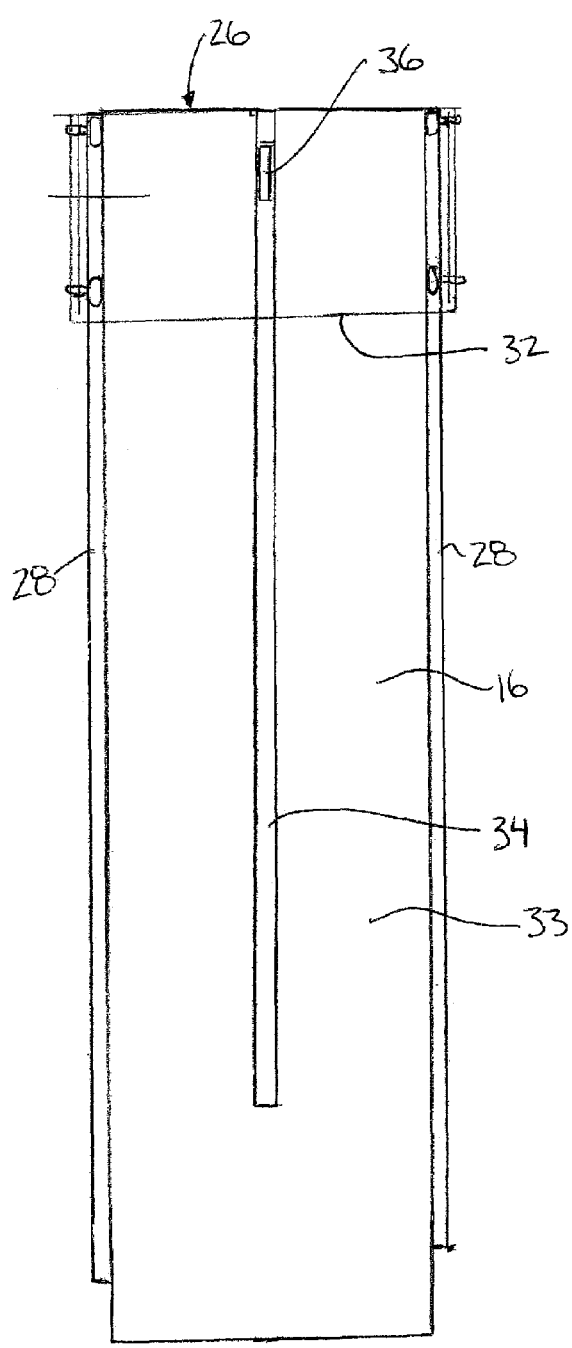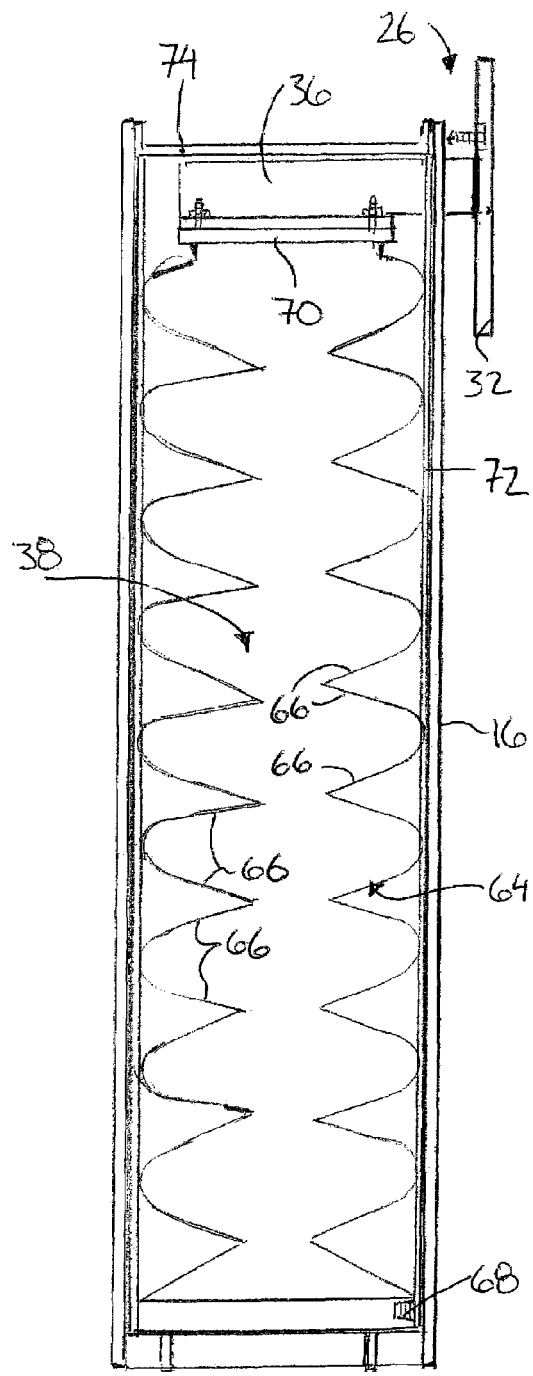
FIGURE 11
FIGURE 12

LIFT DEVICE AND PNEUMATIC ACTUATOR THEREFOR

This application hereby claims the benefit under 35 U.S.C. Section 119(e) of U.S. provisional application 60/664,951 filed Mar. 25, 2005.

FIELD OF THE INVENTION

The present invention relates to a pneumatic lifting device that is particularly suitable for lifting tires and/or brake drums, and also relates to a linear pneumatic actuator which is particularly suited for use with the lifting device described herein.

BACKGROUND

In the automotive industry, the tires used on cars and light trucks are getting larger and heavier, creating a problem for the technicians installing them. Employers and employees are concerned about back injuries and other muscle strains. As of now there are no specific tools for the installation of tires for the automotive industry. Many different styles of tire lifts have been designed, sold and patented for the heavy truck industry. Most of these tools are unsuitable for use in the automotive industry due to their design. These tools are designed to lift tires and tire assemblies from 250 lbs to 1000 lbs. These tools are of heavy construction and have limited height capabilities to a (maximum of 14 inches), making them awkward to use. In the automotive industry speed and mobility are required and the ability to raise the tire to chest height is necessary.

One of the other drawbacks to current heavy tire lift design is the means which the tire is lifted: either hydraulically pumped cylinder or by cable crank means. Each of these methods is very slow and time consuming and generally not considered worthwhile for smaller automotive tires.

Examples of prior art, heavy tire lifts which have been either designed, patented or sold by various manufactures include U.S. Pat. Nos. 6,382,644 (Rawlings); 5,562,389 (Mitchell); 5,112,070 (Hahn); D473,692 (Tafoya); 6,095,745 (Garnett); and 6,106,214 (Saffelle et al). None of the tools described in the noted prior art patents are suitably arranged for quickly lifting and lowering vehicle wheels thereon with a simple and low cost device.

U.S. Pat. Nos. 6,382,644 to Rawlings and 6,106,214 to Saffelle describe further examples of lift devices for wheels. Either a complex jack or hydraulic actuator is required for lifting the wheels thereon in a slow and time consuming operation.

Another known type of lift for vehicle wheels is available by Rotary™, a Dover™ company of Madison, Ind., USA. The lift comprises a wheeled base including an upright fixed thereon upon which a wheel support carriage is slidably mounted. An electric battery powered motor is provided for lifting the wheel relative to the base. Such a motor is particularly slow and provides a limited number of lifting cycles before charging is required. Recharging time thus limits continuous use of the lifting device.

The lifting device by Rotary™ is limited in its use according to several aspects. The most prohibitive is the tall mast which will hit the fenders of most vehicles when the tool is pushed into the wheel well to install a tire. The second are the small wheels and casters the tool sits on, which make the tool hard to use in a shop environment. Thirdly, the device is limited to a 110 lbs capacity due to the electric motors used. Commonly available 19.5 inch diameter wheels rims with tires often weigh 130 lbs and accordingly the lifting device available by Rotary™ could not raise many wheels used on one and two ton vehicles.

U.S. Pat. No. 5,184,930 to Kuhn describes a vehicle lifting system in which a pair of lifting jacks are required to be mounted on opposing sides of a vehicle for actuation by a common actuator located remotely from the two lifting jacks. The lifting jacks are required to be used in pairs and are intended for heavy lifting in a controlled manner contrary to the independence and agility desired in a lifting device for lifting a vehicle wheel, for example in an automotive servicing location and the like.

SUMMARY OF THE INVENTION

According to one aspect of the present invention there is provided a lift device for use with a source of compressed gas to lift an object; the device comprising:

a support frame including a wheeled base supported for rolling movement along the ground and an upright extending upwardly from the wheeled base;

a carriage supported for sliding movement along the upright;

a supporting surface on carriage for movement with the carriage along the upright, the supporting surface being suitably arranged for supporting the object thereon;

a pneumatic lift mechanism coupled between the support frame and the carriage for lifting the supporting surface and an object supported thereon relative to the support frame; and a lift control comprising a supply valve selectively coupling the pneumatic lift mechanism to the source of compressed gas for displacing the carriage along the upright in a first direction and a vent valve selectively coupling the pneumatic lift mechanism to a vent for venting for displacing the carriage along the upright in a second direction opposite to the first direction;

the lift control being supported on the support frame for rolling movement along the ground therewith.

The wheel lift device as described herein uses a pneumatic, air operated cylinder to lift the carriage assembly very quickly to the desired height required by the operator. Automotive workshops are commonly provided with compressors and storage tanks for supplying air or other gas under pressure to power various pneumatic tools. Accordingly, a wheel lift device which relies upon a pneumatic lift mechanism is of low cost to manufacture as no additional motors and the like are required to generate sufficient to force to lift a large range of automotive tires in a very quick and efficient lifting operation. Location of the lift controls directly on the support frame ensures quick access for lifting and lowering tires in proximity to the task being performed.

When the source of compressed gas comprises a conventional compressed air supply line, the supply valve preferably comprises a releasable connection coupling the supply valve to the conventional compressed air supply line.

The upright may comprise an elongate hollow member which houses the pneumatic lift mechanism therein upon which the carriage is movable between opposed ends thereof.

Preferably, the supporting surface comprises a wheel support comprising two parallel and spaced apart rollers projecting outwardly from the upright for rotatably supporting a wheel thereon.

When the base extends outwardly from an inner end adjacent the upright towards an outer end spaced from the upright below the supporting surface, preferably both the inner end and the outer end of the base are supported for rolling movement along the ground.

The supply valve and the vent valve may be supported on opposing sides of the upright, spaced above the base.

When there is provided one or more handles supported on the support frame spaced above the base, the lift control is preferably supported in proximity to the handle.

When there is provided a pair of handles supported on opposing sides of the upright, preferably one of the handles supports the supply valve thereon and the other one of the handles supports the vent valve thereon.

The pneumatic lift mechanism may comprise an expandable bellows member housed within a hollow interior of the elongate hollow member to extend between a fixed end fixedly mounted at one end of the elongate hollow member and a movable end coupled to the carriage for movement therewith along the elongate hollow member. When the bellows is expandable in the longitudinal direction, the lift control displaces the carriage in the first direction when the bellows is expanded and displaces the carriage in the second direction when the bellows is contracted.

Preferably there is provided an auxiliary tool connector coupled in parallel with the supply valve for connection of an auxiliary pneumatic tool to the source of compressed gas.

There may also be provided a support tray fixedly mounted on the upright opposite the supporting surface in which the support tray comprising a generally horizontal supporting surface.

The source of compressed gas may comprise a storage tank integrally supported on the support frame for rolling movement therewith along the ground.

According to a second aspect of the present invention there is provided a pneumatic actuator device for connection to a source of compressed gas for acting in a linear direction, the device comprising;

an elongate hollow member extending in the linear direction;

a carriage supported for sliding movement in the linear direction along the elongate hollow member between opposed ends of the member;

an expandable bellows member housed within a hollow interior of the elongate hollow member and extending between a fixed end fixedly mounted at one end of the elongate hollow member and a movable end coupled to the carriage for movement therewith along the elongate hollow member, the bellows member being expandable in the linear direction; and a lift control comprising a supply valve selectively coupling the bellows member to the source of compressed gas to expand the bellows for displacing the carriage along the upright in a first direction and a vent valve selectively coupling the bellows member to a vent to contract the bellows for displacing the carriage along the upright in a second direction opposite to the first direction.

The bellows member may comprise a plurality of annular partitions foldable relative to one another as the bellows member expands and contracts in the linear direction.

Preferably the bellows member comprises a flexible material having an outer diameter which is near in dimension to an interior dimension of the elongate hollow member.

The elongate hollow member may include a liner of material having a low coefficient of friction which the bellows member engages as it is expanded and contracted.

Some embodiments of the invention will now be described in conjunction with the accompanying drawings in which:

BRIEF DESCRIPTION OF THE DRAWINGS

FIG. 9 and FIG. 10 are front elevational and sectional side elevational views of the upright in the lowered position of the carriage.

FIG. 11 and FIG. 12 are front elevational and sectional side elevational views respectively of the upright with the carriage in the fully raised position.

In the drawings like characters of reference indicate corresponding parts in the different figures.

DETAILED DESCRIPTION

Figure 1:
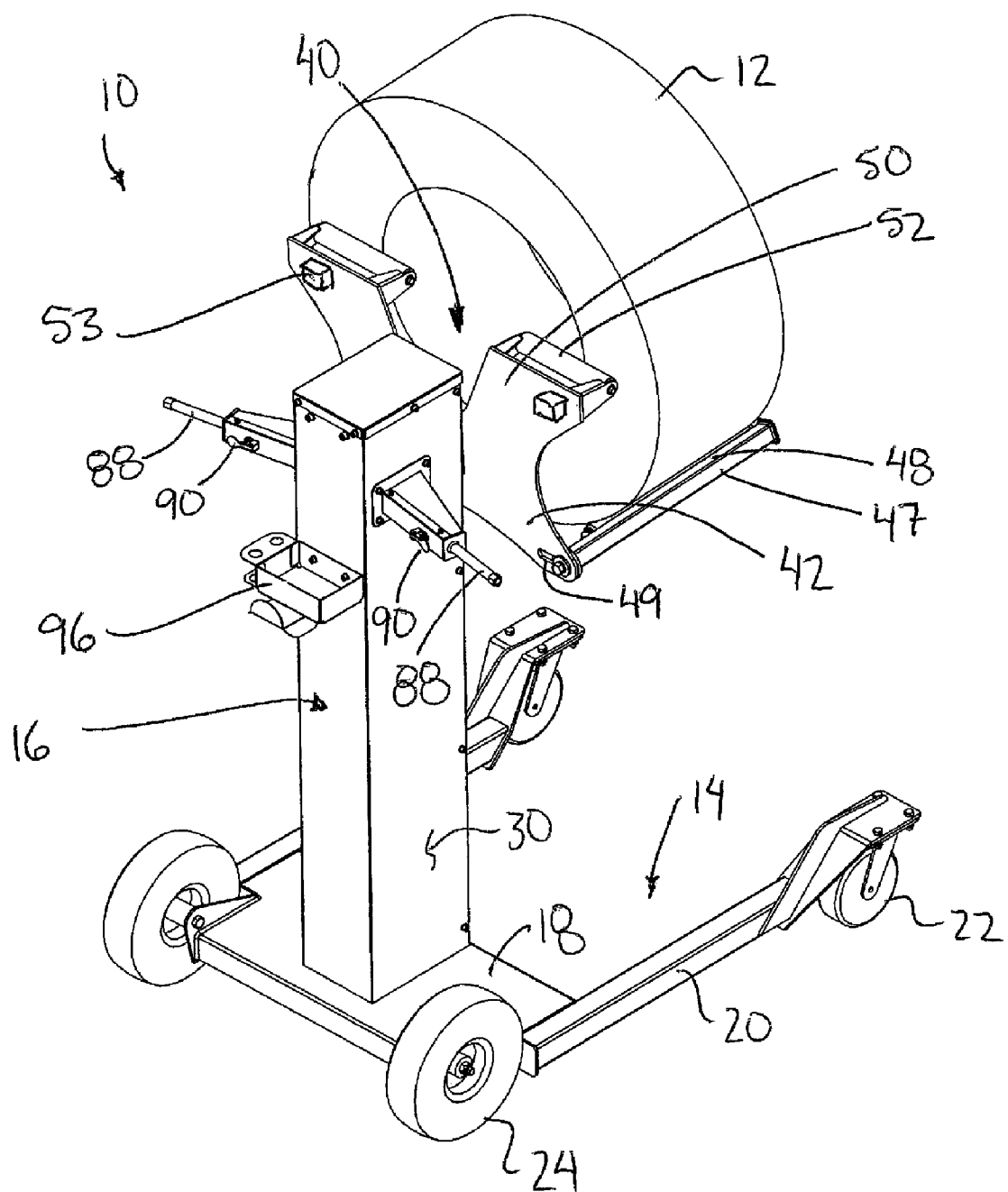
FIG. 1 is a perspective view of the wheel lifting device illustrating a vehicle wheel supported thereon.
Figure 3:
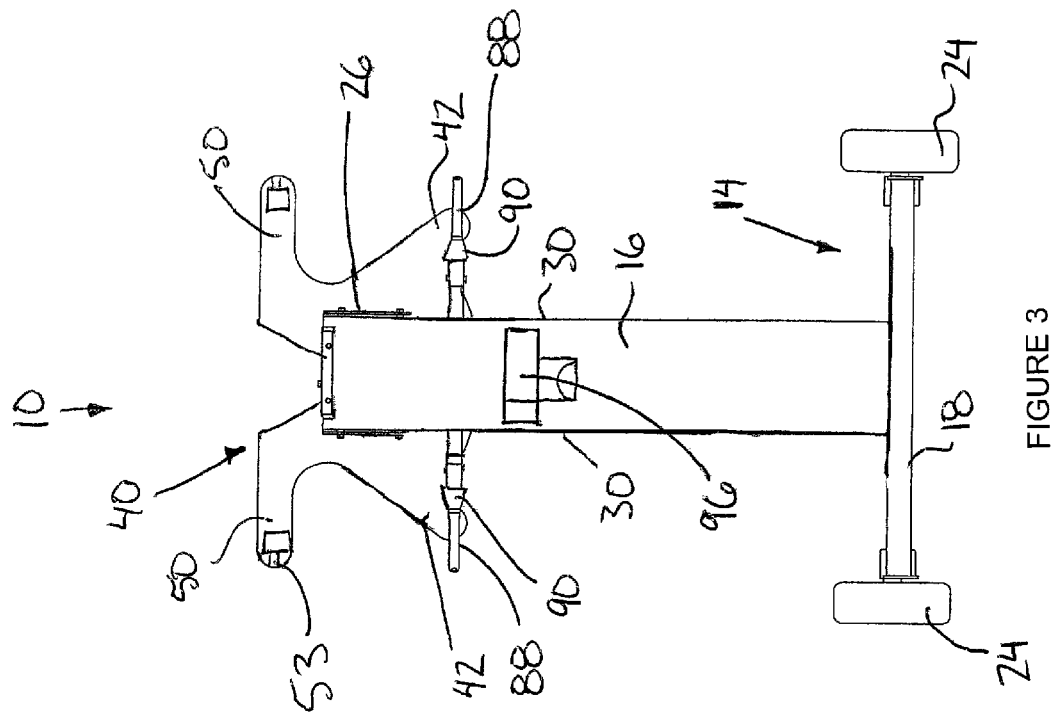
FIG. 2, FIG. 3 and FIG. 4 are respective side elevational, rear elevational and top plan views of the device according to FIG. 1.
Figure 2:
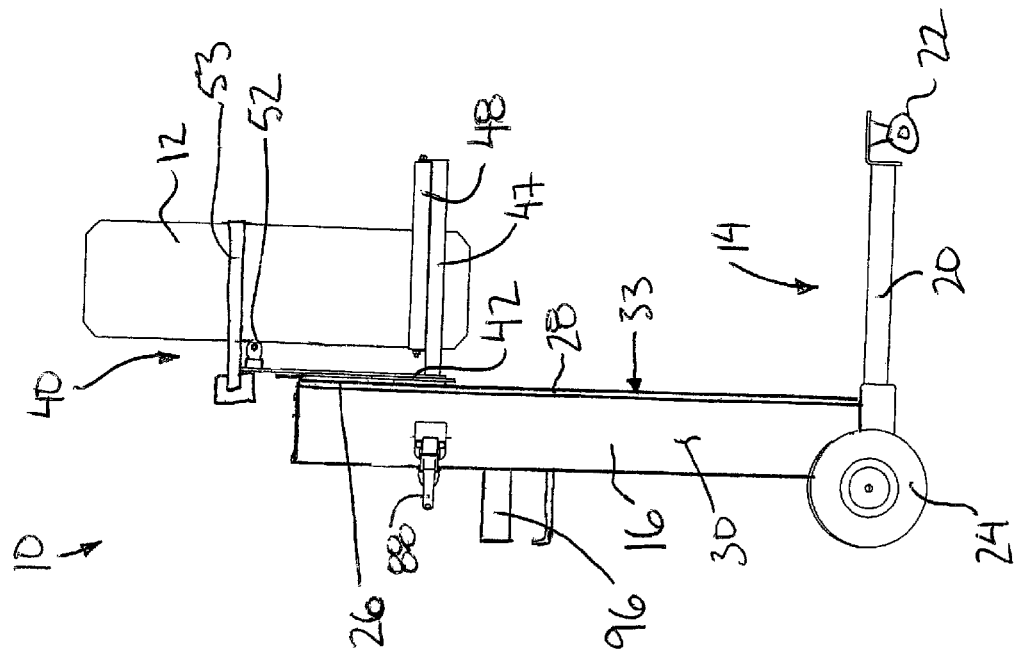
Figure 4:
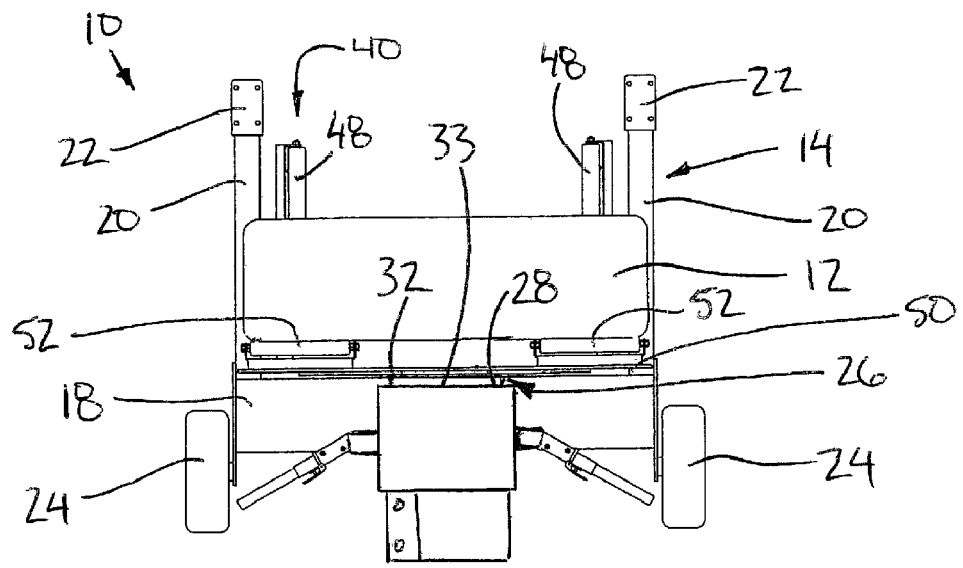

The present invention relates to a pneumatic lifting device that is suitable for lifting tires and/or brake drums from the ground to approximately chest height quickly and safely. The invention also relates to a pneumatic actuator device which is particularly suited for use with the lifting device described herein.

Referring to the accompanying drawings there is illustrated a wheel lifting device generally indicated by reference numeral 10. The device 10 is particularly suited for lifting car and truck tires individually thereon from the ground to a wheel hub when the vehicle is supported spaced above the ground on a vehicle lift. The wheel 12 can be rotated about its axis when supported on the device 10, and can be moved about by rolling the device 10 along the ground. Lifting force for the wheel is provided by conventional compressed air systems typically available in automotive garages and the like. The device is arranged for coupling to a supply line from a typical compressed air tank and compressor combination using conventional connectors available on various commercially available air driven tools.

The device 10 has a support frame which includes a base 14 and an upright 16 fixed to the base to extend upwardly therefrom. The base generally includes a horizontal beam 18 from which two rails 20 extend at opposing ends of the beam parallel and spaced apart from one another. A castor wheel 22 is swivel mounted onto the free end of each of the rails 20 spaced from the beam 18. Wheels 24 are mounted at respective ends of the beam 18 which have a diameter plural times that of the castor wheels. The beam 18 and both rails 20 lie in a generally horizontal plane when the wheels 22 and 24 are supported for rolling movement along the ground.

The upright 16 is supported at one end of the base such that the base extends outwardly from an inner end adjacent the upright towards the outer free end spaced from the upright.

Both the inner end and the outer end of the base are thus supported for rolling movement along the ground.

The upright 16 is a tubular, hollow elongate member of rectangular cross section. The upright is mounted centrally on the beam 18 to extend substantially vertically upward therefrom. A carriage 26 is slidably mounted on the upright 16 for vertical movement in the longitudinal direction of the upright between opposed ends of the upright. The carriage 26 is carried on two tracks 28 mounted adjacent respective opposing sides 30 of the upright at the front interior side 33 thereof. The sides 30 of the upright are oriented parallel to the rails and face laterally outward towards the wheels 24 respectively.

The carriage 26 supports vertically spaced wheels thereon for following within the tracks 28. A main portion 32 of the carriage spans the front interior side 33 of the upright between the opposing sides 30 thereof.

The upright includes a vertically extending slot 34 along the interior side 33 in which the slot 34 extends in the longitudinal direction a full length of the upright. The interior side 33 of the upright faces the free ends of the rails 20 as well as facing the tire 12 being supported on the carriage. The slot 34 receives a link arm 36 therethrough which is fixed with respect to the carriage 26 for movement therewith relative to the upright. The link arm 26 communicates between the carriage and the lift mechanism 38 housed within the hollow interior of the upright.

A wheel support 40 is carried on the carriage for movement therewith relative to the upright 16. The wheel support 40 projects outwardly from the upright in the same direction as the base such that the free end of the base is located spaced directly below the wheel support. The wheel support 40 generally comprises a flat plate lying in a vertical orientation parallel to the front side 33 of the upright. The plate is formed to define two support arms 42 extending downwardly and outwardly in opposing lateral directions from the carriage. The plate also defines two extension arms 50 extending upwardly and outwardly in opposing lateral directions above the support arms 42 respectively. The extension arms span a distance similar to that of the support arms.

A main roller 48 is supported at the free outer end of each support arm 42 to extend substantially perpendicularly thereto such that the two main rollers 48 are parallel to one another, substantially horizontal, spaced apart and project outwardly from the upright. Once a wheel is supported on the two rollers so that the wheel axis is parallel to the respective axes of the rollers 48, the wheel can be rotated thereon about its respective axis by rotating the rollers.

The main rollers 48 are rotatably supported at respective ends on a roller arm 47 which supports the main rollers on the respective support arms 42. Each roller arm 47 is fastened at an inner in a respective mounting slot 49 formed in the free end of the respective support arm. The mounting slots 49 are each oriented to extend laterally outward from the upright in a horizontal direction. Fasteners are arranged to secure each roller arm 47 at a selected position along the mounting slots 49. The lateral spacing between the main rollers can thus be readily adjusted.

The extension arms 50 of the wheel support each mount an auxiliary roller 52 towards the free end thereof. The auxiliary rollers 52 rotate about respective axes which are horizontal and lie in a common vertical plane substantially parallel to the support arms and perpendicular to the axis of the main rollers 48. The auxiliary rollers are supported spaced directly above the inner ends of the main rollers 48 for engaging a side wall of the wheel supported on the wheel support 40.

In the illustrated embodiment, the substantially vertically oriented components of the wheel support actually extend upward at an inclination of five degrees from vertical, rearward and away from the direction the rails project from the beam. In addition, the horizontal components, namely the rollers 48, extend up an upward inclination of five degrees in a forward direction towards the free ends of the rails. In this manner, a wheel supported on the wheel support is less likely to tilt forward and fall off the wheel support in use.

A retention strap 53 is provided for retaining a wheel on the wheel support 40. The retention strap 53 is retractable into a housing supported on one of the extension arms 50 and is selectively coupled to a latch supported on the other one of the extension arms 50.

The lift mechanism 38 housed within the upright includes an expandable bellows member 64 which is elongate in the longitudinal direction of the upright. The bellows is comprised of a flexible material formed into plural annular partitions 66 which are foldable relative to one another when joined into a sealed envelope for containing pressurized air therein. The bellows member is sealed at a base of the upright in fixed connection therewith at a lower fixed end. An air inlet 68 is located at the base to control air flow into and out of the envelope of the bellows member 64. A top movable end of the bellows member is sealed in fixed connection with a top plate 70 in fixed connection with the link arm 36 of the carriage for movement therewith. The top plate 70 is thus vertically slidable with the carriage relative to the upright.

The upright includes a liner 72 formed of a material having a low coefficient of friction for ease of sliding movement of the bellows within the interior of the upright as it is expanded and contracted. The outer diameter of the bellows member 64 is approximately equal or only slightly less than the interior diameter of the upright including the liner 72 so that the upright provides support to the bellows whereby expansion and contraction of the bellows member 64 is concentrated in the longitudinal direction of the uprights. With the bellows being expandable in the longitudinal direction, the lift control displaces the carriage in the first direction when the bellows is expanded and displaces the carriage in the second direction when the bellows is contracted.

An end cap 74 is mounted at the top end of the upright to act as a stop which limits further upward movement of the top plate 70 beyond the top if the upright such that the movable end of the bellows does not extend upward beyond the top of the upright according to the fully raised position described and shown in FIGS. 11 and 12. The bellows member 64 is elongate in the linear direction of actuation in which it expands so that when air pressure is vented through the inlet 68 the bellows member collapses and the top plate 70 lowers within the upright, while introduction of compressed air into the air inlet 68 causes expansion of the bellows member in an upward direction for lifting the top plate and carriage connected thereto.

In further embodiments, the top plate 70 may include its own guides for guiding its linear movement within the upright, however in the illustrated embodiment the top plate 70 is permitted to float within the interior of the upright as its motion is already restricted to only a vertical and linear direction due to the carriage to which it is fixed which has its own exterior guide track.

Figure 13:
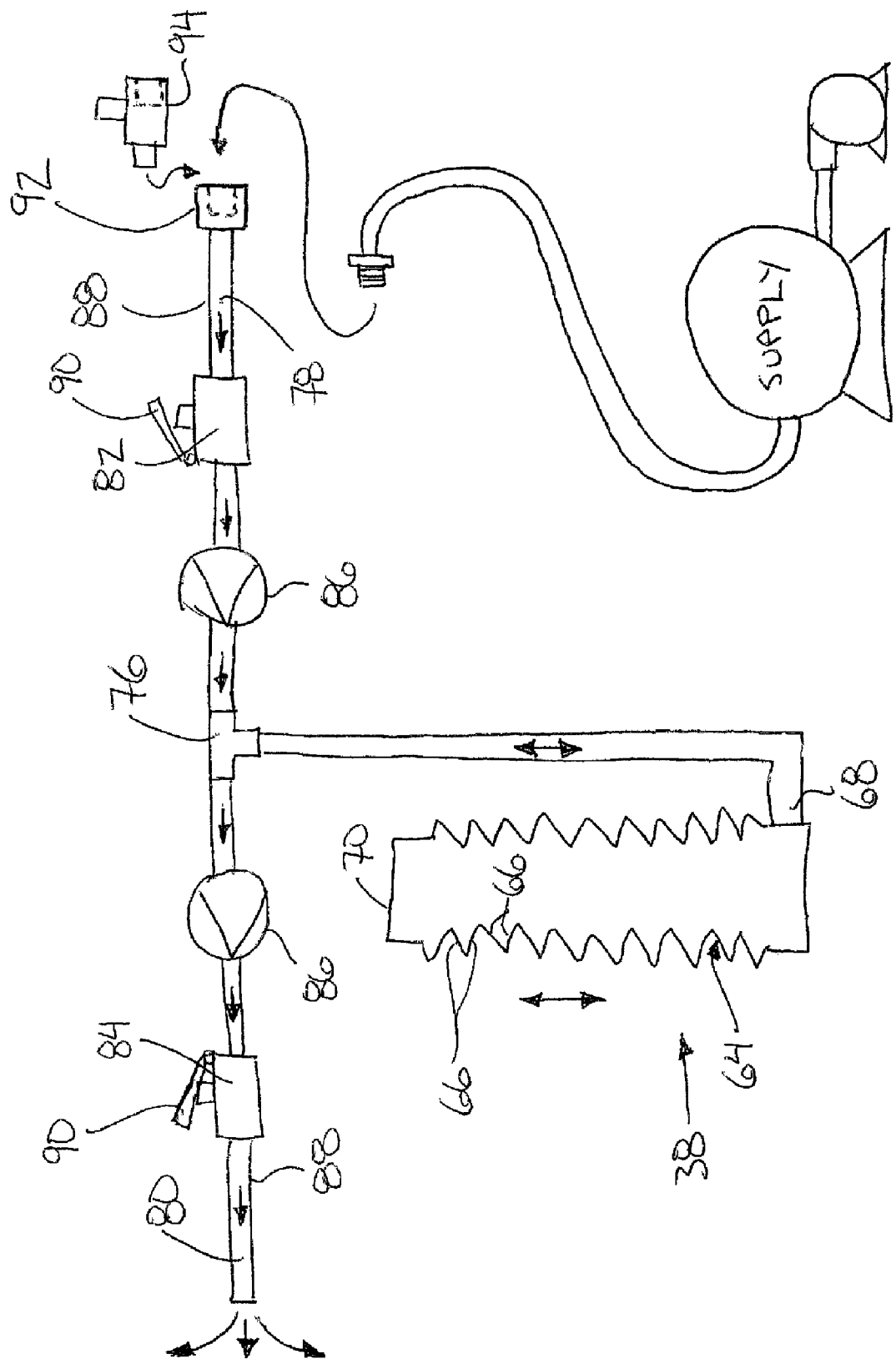
FIG. 13 is a schematic representation of the pneumatic connection between the lift mechanism and the supply of compressed gas.

As shown in FIG. 13, the air inlet 68 is connected to a T-connector 76 which is coupled in series between a supply line 78 and a vent line 80. When a supply valve 82 in series with the supply line is opened, compressed air is fed through the T-connector 76 to the air inlet 68 for expanding the bellows. Alternatively, when the supply valve 82 is closed and a vent valve 84 in series with the vent line 80 is opened, air is vented from the bellows through the inlet 68 and T-connector 76 to the atmosphere.

A lift control is thus defined comprising the supply valve 82 which selectively couples the pneumatic lift mechanism to the source of compressed gas for displacing the carriage along the upright in a first direction and the vent valve 84 which selectively couples the pneumatic lift mechanism to a vent for venting for displacing the carriage along the upright in a second direction opposite to the first direction. The components of the lift control are all supported on the upright for rolling movement along the ground together with the remaining components of the lift device.

A variable flow restrictor 86 is coupled in series with each of the supply line and vent line to permit responsiveness of raising and lowering actions to be controlled by simply controlling the flow rates of air being supplied to or vented from the bellows.

A pair handles 88 are coupled to the rear exterior side of the upright 16 to extend laterally outward from opposite sides of the upright at a slight rearward incline away from the wheel support. The handles 88 are fixed relative to the upright, spaced above the base, and permit manual positioning of the device on its wheels relative to the ground when grasped by an operator.

Each of the handles 88 receives one of the supply and vent lines concentrically therethrough so that compressed air is received through the free end of one of the handles and vented through the free end of the opposing handle. The supply and vent valves are mounted on opposing sides of the upright on the two handles 88 respectively and are actuated by respective thumb levers 90 positioned on the handles 88 respectively for comfortable actuation by the thumbs of the operator having his hands placed on the handles. Each of the valves is biased into the closed position and remains closed until the respective thumb lever is depressed.

When the source of compressed gas comprises a conventional compressed air supply line, the supply valve comprises a releasable connection 92 mounted in the free end of the respective handle 88 for coupling the supply valve to the conventional compressed air supply line connectors used for various commercially available pneumatically driven tools. In this configuration, the lift device including the lift controls thereon are connected the source of compressed gas remotely by a flexible connecting line.

In some embodiments an auxiliary T-connector 94 is mounted in series between the supply line connector and the connector 92 at the free end of the handle 88 receiving the supply line therethrough so that an auxiliary supply line can be branched off of the handle for additional air driven tools to be coupled in parallel with the wheel lift device.

The upright may also includes a holster supported thereon for an air driven impact gun for example. The holster may be provided in conjunction with or in addition to a tray 96 mounted on the rear of the upright for supporting additional accessories, for example a tire inflation chuck or lug nuts associated with a particular wheel being lifted. The tray 96 is fixedly mounted on the upright opposite the wheel support and includes a generally horizontal supporting surface for supporting the accessories thereon.

Figure 14:
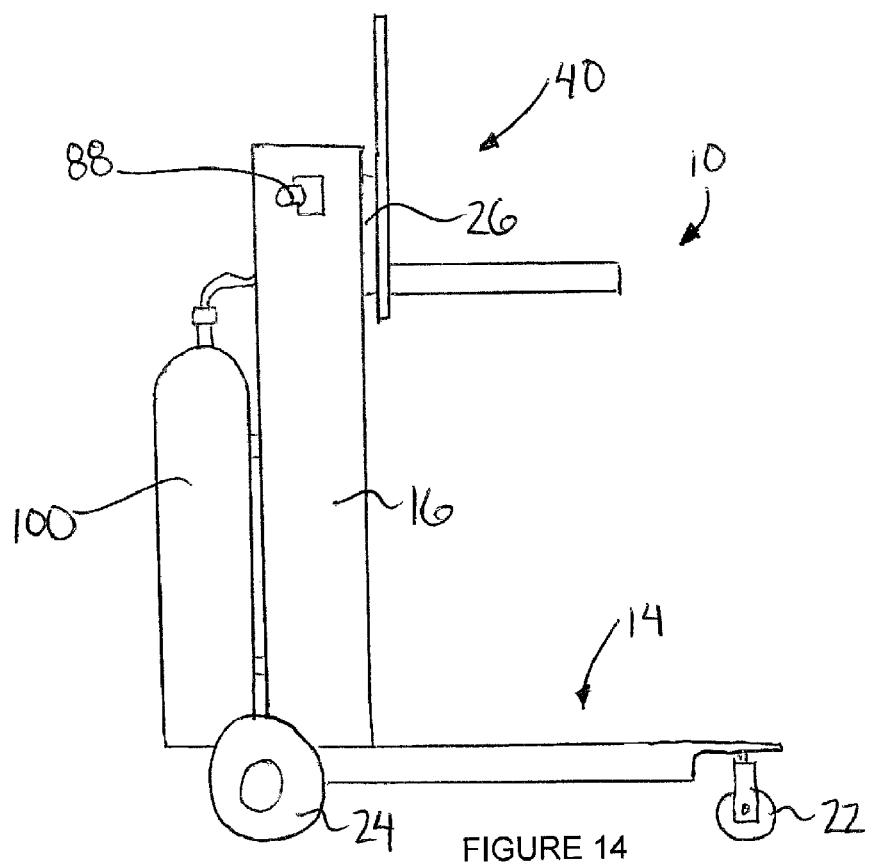
FIG. 14 is a schematic representation of a further embodiment of the lift device in which the supply of compressed gas is integrally supported thereon.
Figure 5:
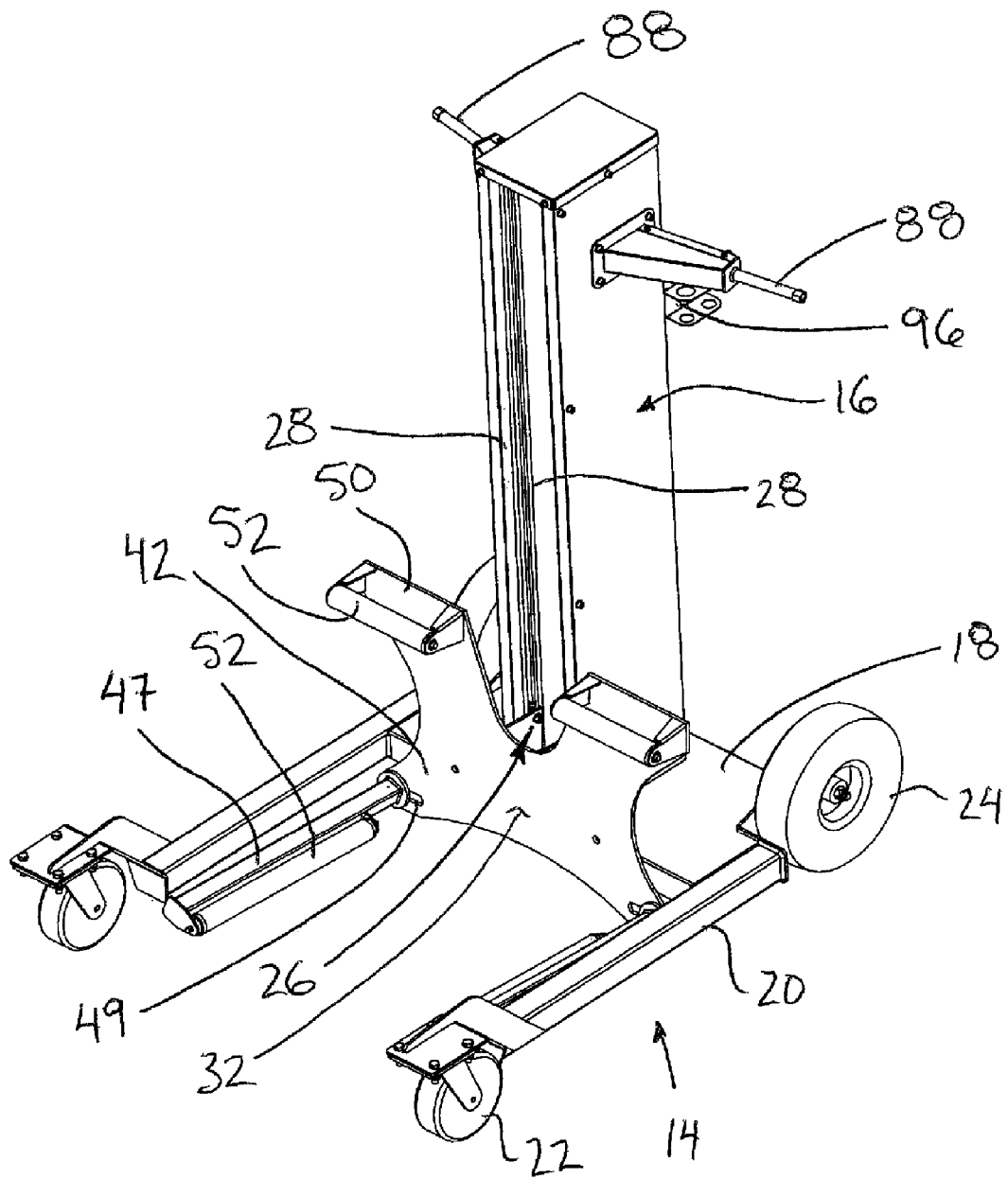
FIG. 5 and FIG. 6 are perspective views of the carriage in the lowered and raised positions respectively.
Figure 6:
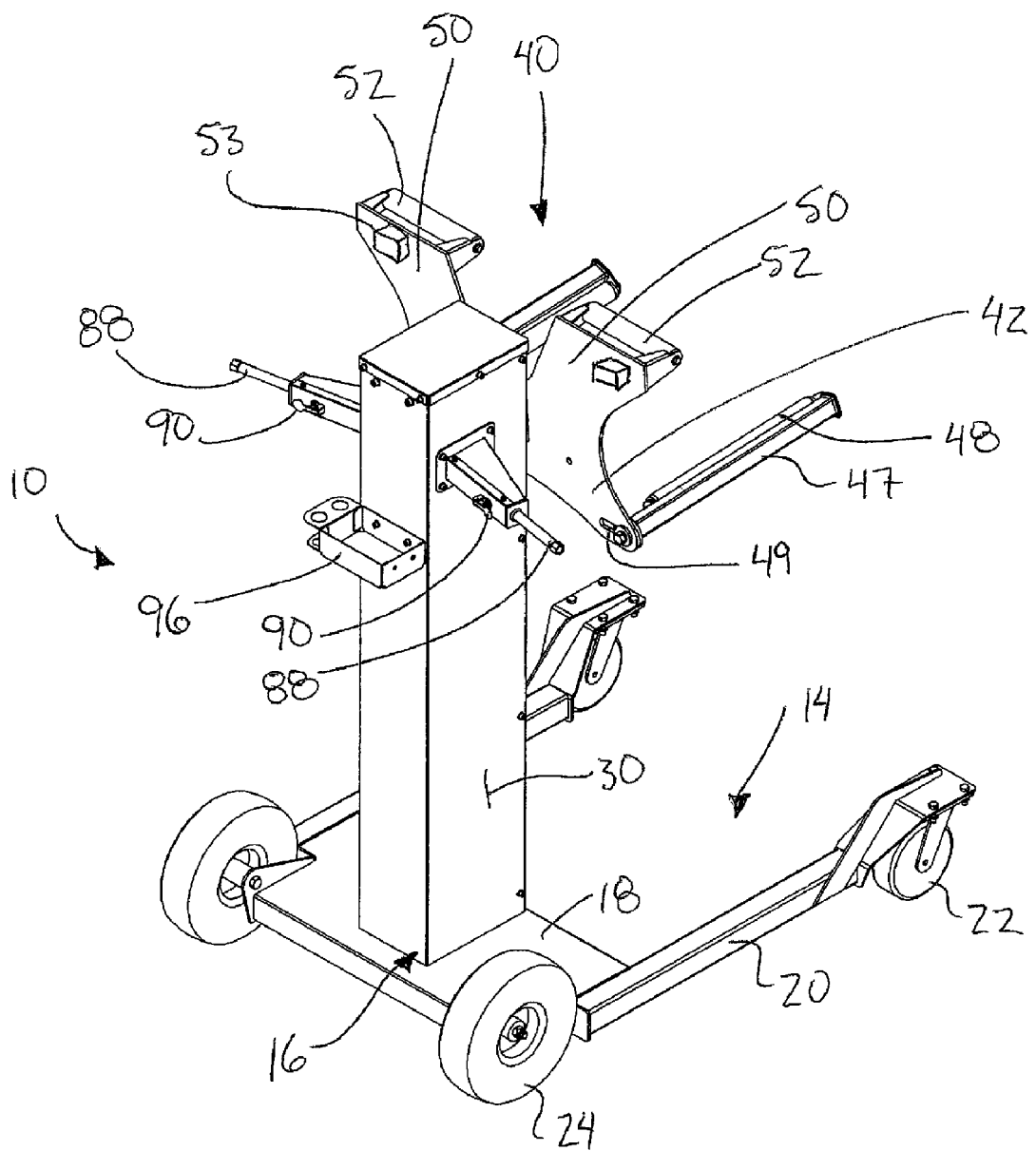
Figure 7:
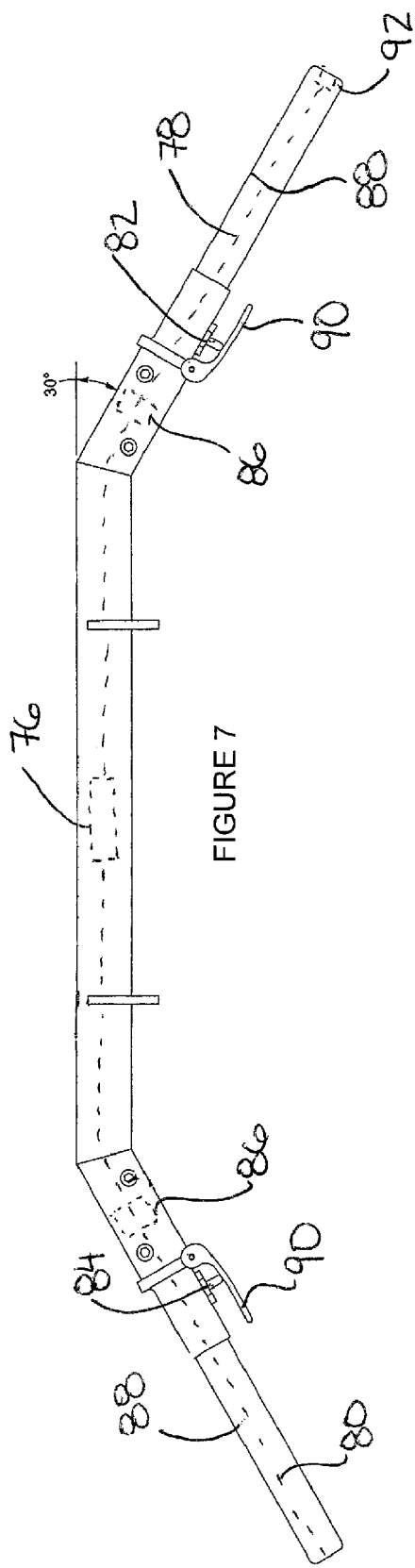
FIG. 7 is a plan view of the handles of the wheel lifting device.
Figure 8:
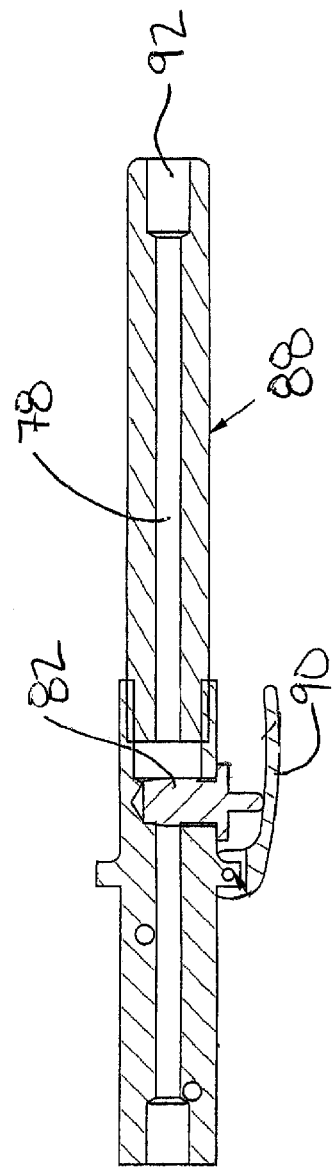
FIG. 8 is a horizontal sectional view of one of the handles.

Turning now to FIG. 14, a further embodiment of the lift device 10 is configured similarly to the embodiment illustrated in the remaining figures, but with the addition of an integrally supported storage tank 100 mounted thereon. The storage tank 100 is fixedly supported on the rear side of the upright opposite the wheel support, for rolling movement with the device along the ground. The tank 100 stores the compressed gas thereon and connects to the supply line of the lift control to selectively provide compressed gas to the bellows. The storage tank may remain fixed on the upright for periodic refilling or recharging with compressed air or alternatively, replacement cartridges which are preloaded with compress gas may be selectively coupled to the device.

In further embodiments, the air lift mechanism housed within the upright may be replaced with other types of lift mechanism which receive compressed air for actuation thereof, including air cylinders for a combination of a cable linkage connected with an air cylinder and the like. Simply by providing some form of lift mechanism powered by compressed air, conventional compressed air systems in garages and the like may be used for lifting wheels without any additional power requirements or other expensive motors and the like being required. The further incorporation of a supply valve and a vent valve in opposing handles ensures that the operator's hands are both safely positioned on the handles during operation with the operator being at the rear side of the upright opposite the carriage and wheel support carrying the wheel thereon.

As described above with regard to the illustrated embodiments, the lifting device will consist of several sub assemblies which combine to form a tire lift assembly. The main part will be the cart assembly to which all the sub-assemblies are attached to. The cart will have a lower frame to which the main wheels will be attached. The tires will be either rubber (air filled) or of solid construction. The wheels will be of such a size that the tire installer will be able to roll over small obstacles in the shop environment (air hose, extension cords, water lines etc.) The front tires are located on the front of the "U" shaped lower arm. Attached to the end of the arms will be 360 degrees solid, swivel casters that will allow the tire installer to be steered left or right. The lower frame is installed to the centre tower. This tower serves several purposes. The main one is to house the pneumatic cylinder. Connected to the pneumatic cylinder will be the main lift carriage which will slide up and down the front of the centre tower. The towers third function is to support the main handles. These handles are located towards the top of the tower and will be welded to the right and left side or of one piece construction. The centre tower will be constructed of steel tube with the front side having a slot cut out running top to bottom where the carriage assembly will run.

Located inside the tower is the pneumatic lifting mechanism which may comprise an expandable bellows member. Alternatively the lifting mechanism may comprise a cylinder either of 2 stage piston style or a single or double acting cable cylinder. The cylinder is attached to the tower frame by 4 bolts screwed into the lower base plate of the pneumatic cylinder. The top rod of the pneumatic cylinder has a ½ inch hole that is threaded to accept a bolt to the depth of 1½" to 2". This bolt will hold the carriage support tight to the top of the pneumatic cylinder. On the tire lift that uses cable type cylinder, the cable will be attached to the lift carriage by means of a threaded bolt attached to the end of the cable.

In the preferred embodiment illustrated herein, the pneumatic lifting mechanism comprises a bellows air cylinder based on a rubber bellows bladder expanding in a steel square tube cylinder. There are several key features that make the bellows air cylinder a great advantage for the lifting device.

1. Cost: It will be much cheaper and more reliable than cable cylinders and the bellows cylinder will have many less parts than the cable type cylinder.

2. Size: The upright required is a 4"×8" square tube to house a cable cylinder and related parts, but with the bellows type cylinder, a 4"×4" square tube can be used for the upright, downsizing the lifting device size greatly.

3. Lift Capacity: A 1½" cable cylinder has a working capacity of 190 lbs at 100 psi air pressure, but a 3½" bellows type cylinder will lift over 500 lbs at 50 psi air pressure.

Rodless air cylinders could also be used to lift the carriage up and down, however their cost is usually prohibitive.

The bellows air cylinder will be able to perform many other industrial uses. The use of two bellows bladders in a square tube will make the cylinder double acting meaning it can take loads in both directions back and forth.

In the illustrated embodiment, the carriage assembly consists of several parts including: carriage arm support, carriage slide assembly, frame, lower rollers and upper rollers. The lower rollers will be fully adjustable to move back and forth in the T-frame for different size tires and brake drums. There will be either notches or holes to where the lower slide roller will fall into positively locking the roller in place to prevent the weight of the tire or brake drum from moving it. The lower rollers will have bearings mounted at each end allowing the lower roller to rotate easily when a tire is loaded on the top of them. These lower rollers will be made of steel tubing. The arms that support the lower rollers will be timed together by gears at the top end. This assures that the operator cannot misadjust the tool settings for different size tires. Mounted to the top arm on each side will be a Teflon roller that will act as a guide for the tire and allow the tire to be rotated to align up with the stud holes.

The next sub-assembly will be the pneumatic controls which will be attached to the tower handles. The right side will house the main air inlet valve; attached to this valve will be an air fitting allowing an air hose to be coupled to the main air inlet valve. The air will travel down a rubber or steel line to the base end of the two stage pneumatic cylinder or single acting cable cylinder. On the left handle will be another lever controlled air valve. At the base end of the pneumatic cylinder a line will go into this left side air valve allowing for the exhausting of the air inside the pneumatic cylinder. This allows the tire to gently lower to the proper height for installation.

Operation of the Tire Brake Drum Installer

To raise a tire onto a vehicle the operator of the tire lift will:
1. Lower the tire lift to the floor, make sure the rollers set to the size of tire being lifted and roll the tire onto the lower rollers from the left or right side.
2. Connect air hose to inlet fitting on handle.
3. Position tire lift in line with the axle on front hub.
4. Depress right handle allowing air to enter base of cylinder forcing the tire carriage up, lift the tire up to the desired height or higher.
5. To line tire up with axle studs depress left handle to let air out of pneumatic cylinder gently lowering the carriage to desired height, spin the tire for final lining of stud holes with studs.
6. Push the tire installer toward the vehicle until tile studs arc through rim of tire. Install wheel lug nuts. The tire installer can now be lowered to lift the next tire to be installed.

The lift device with only very few modifications can be used in the warehousing industry for lifting pallets and other types of loads. There could be internal air storage cylinders installed inside the upright that could be charged with air giving the lift up to 10 cycles per charge. A nitrogen cylinder could be mounted to the rear of the upright, giving the lift device hundreds of cycles before needing to recharge. The lift device could be modified to become a power dolly with the addition of a flat front load plate. The lift device with a flat load plate installed thereon could be used to unload and load items in the back of trucks and vans for example.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pneumatic actuator device for connection to a source of compressed gas for acting in a linear direction, the device comprising;
    an elongate, generally tubular, hollow member extending in the linear direction, the hollow member including a slot formed therein extending in the linear direction;
    a carriage supported for sliding movement in the linear direction along the elongate hollow member between opposed ends of the member;
    an expandable bellows member housed within a hollow interior of the elongate hollow member and extending between a fixed end and a movable end;
    the fixed end of the expandable bellows member being fixedly mounted at one end of the elongate hollow member in fixed relation thereto;
    a link member extending through the slot and fixedly coupling the movable end of the bellows member to the carriage so as to be arranged for movement of the movable end of the bellows member together with the link member and the carriage along the elongate hollow member;
    a stop member mounted on the hollow member so as to prevent the movable end of the bellows member from extending beyond an end of the hollow member in a fully extended position of the bellows member; and
    the bellows member being formed of flexible material so as to be arranged to be expandable in the linear direction; and
    a lift control comprising a supply valve selectively coupling the bellows member to the source of compressed gas to expand the bellows for displacing the carriage along the upright in a first direction and a vent valve selectively coupling the bellows member to a vent to contract the bellows for displacing the carriage along the upright in a second direction opposite to the first direction;
    the supply valve and the vent valve being arranged to communicate with the bellows member adjacent the fixed end; and
    the bellows member haying an outer diameter which is near in dimension to an interior dimension of the hollow member such that:
        the hollow member provides support to the bellows member formed of flexible material during expansion and contraction of the bellows member; and
        the hollow member concentrates expansion and contraction of the bellows member formed of flexible material in the linear direction.

2. The device according to claim 1 wherein the bellows member comprises a plurality of annular partitions foldable relative to one another as the bellows member expands and contracts in the linear direction.

3. The device according to claim 1 wherein the elongate hollow member includes a liner of material having a low coefficient of friction.

4. The device according to claim 3 wherein the bellows member is slidable relative to the hollow member.

5. The device according to claim 1 wherein there is provided an end member mounted adjacent the movable end of the bellows member so as to be arranged for movement therewith relative to the hollow member and a stop member mounted on the hollow member and arranged to prevent movement of the end member beyond an end of the hollow member.

6. A lift device for use with a source of compressed gas to lift an object, the device comprising:

a support frame including a wheeled base supported for rolling movement along the ground and an upright extending upwardly in a longitudinal direction from the wheeled base;

the upright comprising an elongate, generally tubular, hollow member, the hollow member including a slot formed therein extending in the longitudinal direction;

a carriage supported on the upright so as to be arranged for sliding movement along the upright in the longitudinal direction of the upright;

a supporting surface on the carriage arranged for movement with the carriage along the upright, the supporting surface being suitably arranged for supporting the object thereon;

a pneumatic lift mechanism coupled between the support frame and the carriage so as to be arranged for lifting the supporting surface and an object supported thereon relative to the support frame;

the pneumatic lift mechanism comprising an expandable bellows member housed within a hollow interior of the hollow member and extending between a fixed end and a movable end;

the fixed end of the expandable bellows member being fixedly mounted on the support frame at one end of the hollow member in fixed relation thereto;

the movable end of the expandable bellows member being coupled to the carriage so as to be arranged for movement therewith along the elongate hollow member; and the bellows member being formed of flexible material so as to be arranged to be expandable in the longitudinal direction;

a link member extending through the slot in the upright and fixedly coupling the movable end of the bellows member to the carriage so as to be arranged for movement of the movable end of the bellows member together with the link member and the carriage relative to the upright;

a stop member mounted on the upright and arranged to prevent the movable end of the bellows member from extending beyond a top of the upright in a fully raised position of the bellows member; and a lift control comprising a supply valve selectively coupling the pneumatic lift mechanism to the source of compressed gas so as to be arranged for displacing the carriage along the upright in a first direction and a vent valve selectively coupling the pneumatic lift mechanism to a vent for venting so as to be arranged for displacing the carriage along the upright in a second direction opposite to the first direction;

the bellows member being expandable in the longitudinal direction such that the lift control displaces the carriage in the first direction when the bellows is expanded and displaces the carriage in the second direction when the bellows is contracted; and the bellows member having an outer diameter which is near in dimension to an interior dimension of the hollow member; and the bellows member being arranged such that the hollow member provides support to the bellows member during expansion and contraction of the bellows member.

7. The device according to claim 6 wherein the supply valve and the vent valve of the lift control are supported on the support frame so as to be arranged for rolling movement along the ground with the support frame.

8. The device according to claim 6 in combination with a source of compressed gas comprising a conventional compressed air supply line, the supply valve comprising a releasable connection coupling the supply valve to the conventional compressed air supply line.

9. The device according to claim 6 wherein the supply valve and the vent valve are supported on opposing sides of the upright, spaced above the base.

10. The device according to claim 6 wherein there is provided at least one handle supported on the support frame spaced above the base, the lift control being supported in proximity to said at least one handle.

11. The device according to claim 6 wherein there is provided a pair of handles supported on opposing sides of the upright, one of the handles supporting the supply valve thereon and the other one of the handles supporting the vent valve thereon.

12. The device according to claim 6 wherein the bellows member comprises a plurality of annular partitions foldable relative to one another as the bellows member expands and contracts in the linear direction.

13. The device according to claim 6 wherein the bellows member has an outer diameter which is near in dimension to an interior dimension of the elongate hollow member.

14. The device according to claim 6 wherein the elongate hollow member includes a liner of material having a low coefficient of friction.

15. The device according to claim 6 wherein there is provided an auxiliary tool connector coupled in parallel with the supply valve and arranged for connection of an auxiliary pneumatic tool to the source of compressed gas.

16. The device according to claim 6 wherein there is provided a support tray fixedly mounted on the upright opposite the supporting surface, the support tray comprising a generally horizontal supporting surface arranged to support a tool thereon.

17. The device according to claim 6 in combination with a source of compressed gas comprising a storage tank supported on the support frame for rolling movement therewith along the ground.

18. The device according to claim 6 wherein there is provided a slot formed in the upright to extend in the longitudinal direction of the upright and a link member extending through the slot and fixedly coupling the movable end of the bellows member to the carriage through the slot so as to be arranged for movement of the movable end of the bellows member together with the link member and the carriage along the elongate hollow member.

19. The device according to claim 18 wherein the slot extends in the longitudinal direction substantially a full length of the upright.

20. The device according to claim 6 wherein the carriage is supported for sliding movement along an interior side of the upright and the slot extends along said interior side of the upright.

* * * * *